United States Patent

Nelson

Patent Number: 6,075,640
Date of Patent: Jun. 13, 2000

[54] SIGNAL PROCESSING BY OPTICALLY MANIPULATING POLARITONS

[75] Inventor: Keith A. Nelson, Newton, Mass.

[73] Assignee: Massachusetts Institute of Technology, Cambridge, Mass.

[21] Appl. No.: 09/199,745

[22] Filed: Nov. 25, 1998

Related U.S. Application Data

[60] Provisional application No. 60/066,541, Nov. 26, 1997.

[51] Int. Cl.[7] .............................. G02B 26/00; G02F 1/01; G02F 3/00; G02F 1/03; G02F 1/035

[52] U.S. Cl. ........................... 359/239; 359/108; 359/243; 385/2; 385/14

[58] Field of Search ..................................... 359/107, 108, 359/237–240, 243, 245; 385/2, 3, 14; 505/181, 182

[56] References Cited

U.S. PATENT DOCUMENTS

| | | | |
|---|---|---|---|
| 5,091,980 | 2/1992 | Ogawa et al. | 385/3 |
| 5,116,121 | 5/1992 | Knoll et al. | 356/301 |
| 5,275,168 | 1/1994 | Reintjes et al. | 600/476 |
| 5,418,797 | 5/1995 | Bashkansky et al. | 372/3 |
| 5,451,785 | 9/1995 | Faris | 250/330 |
| 5,623,145 | 4/1997 | Nuss | 250/358.1 |
| 5,710,430 | 1/1998 | Nuss . | |

OTHER PUBLICATIONS

Bozhevolnyi et al., "Two–Dimensional Micro–Optics of Surface Plasmons," Physical Review Letters, 78:2823–2826, Apr. 7, 1997.

Dhar et al., "Single–Pulse and Multiple–Pulse Femtosecond Spectroscopy of Ferroelectric Materials," Ferroelectrics, 164:1–13, 1995.

Kawashima et al., "Femtosecond Pulse Shaping, Multiple–Pulse Spectroscopy, and Optical Control," Annu. Rev. Phys. Chem., 46:627–656, 1995.

Kleinman et al., "Theory of Electrooptic Shock Radiation in Nonlinear Optical Media," IEEE Journal of Quantum Electronics, QE–20:964–970, Aug. 1984.

Nelson, "Coherent Control: Optics, Molecules, and Materials," Springer Series in Chemical Physics, 60:47–49, 1994.

*Primary Examiner*—Georgia Epps
*Assistant Examiner*—David N. Spector
*Attorney, Agent, or Firm*—Fish & Richardson P.C.

[57] ABSTRACT

The invention features methods and systems for processing signals by optically manipulating polaritons. In one embodiment, the signal processing method includes: converting a plurality of spatially separated input signals into polaritons that propagate in a signal processing material; optically manipulating the polaritons at a plurality of spatially separated locations in the signal processing material; and converting the manipulated polaritons into at least one output signal. In another embodiment, the signal processing method includes: converting an input signals into a polariton that propagates in a non-conductive signal processing material; optically manipulating the polariton as it propagates in the signal processing material; and converting the manipulated polaritons into an electrical output signal at an interface between the signal processing material and a conductive path in another material.

41 Claims, 6 Drawing Sheets

| Signal | Data Sequence |||||||||||||||
|---|---|---|---|---|---|---|---|---|---|---|---|---|---|---|---|
| Input Signal 26 | 1 | 0 | 1 | 1 | 0 | 0 | 1 | 1 | 1 | 0 | 0 | 1 | 0 | 0 | 0 |
| Optical Signal 32a | 1 | 0 | 0 | 0 | 0 | 1 | 0 | 0 | 0 | 0 | 1 | 0 | 0 | 0 | 0 |
| Optical Signal 32b | 0 | 1 | 0 | 0 | 0 | 0 | 1 | 0 | 0 | 0 | 0 | 1 | 0 | 0 | 0 |
| Optical Signal 32c | 0 | 0 | 1 | 0 | 0 | 0 | 0 | 1 | 0 | 0 | 0 | 0 | 1 | 0 | 0 |
| Optical Signal 32d | 0 | 0 | 0 | 1 | 0 | 0 | 0 | 0 | 1 | 0 | 0 | 0 | 0 | 1 | 0 |
| Optical Signal 32e | 0 | 0 | 0 | 0 | 1 | 0 | 0 | 0 | 0 | 1 | 0 | 0 | 0 | 0 | 1 |
| Electrical Output Signal 40a | 1 ||||| 0 ||||| 0 |||||
| Electrical Output Signal 40b | 0 ||||| 1 ||||| 1 |||||
| Electrical Output Signal 40c | 1 ||||| 1 ||||| 0 |||||
| Electrical Output Signal 40d | 1 ||||| 1 ||||| 0 |||||
| Electrical Output Signal 40e | 0 ||||| 0 ||||| 0 |||||

FIG. 4

SIGNAL PROCESSING BY OPTICALLY MANIPULATING POLARITONS

CROSS REFERENCE TO RELATED APPLICATIONS

This application claims priority from provisional application Ser. No. 60/066,541, entitled "Ultrafast Optical Control over Signals and Materials," filed Nov. 26, 1997, the contents of which are incorporated herein by reference.

BACKGROUND OF THE INVENTION

The invention relates to electro-optical signal processing systems.

In many signal-processing systems, charge carriers such as electrons or holes carry signal information. However, the speed of such charge carriers and the bandwidth of information carried by them is fundamentally limited by thermally induced scattering of the charge carriers in the charge transport material. In most conductors, the bandwidth of the electrical signals carried by the charge carriers is typically limited to on the order of 1–10 GHz at room temperature. Furthermore, although superconducting sources operating at liquid helium temperatures can generate electrical signals having signal bits on the order of 1 psec (a bandwidth of 1 THz), as these signals propagate the charge carriers will incoherently scatter, and the high bandwidth information will be lost.

In contrast, optical signals propagate at much faster speeds and undergo much less thermal scattering than those of charge carriers, even in optically dense materials. Moreover, generating high-bandwidth optical signals is becoming routine. For example, commercially available titanium sapphire lasers can generate pulses having durations approaching 10 fsec (corresponding to a bandwidth of 100 THz) and such pulses have been converted into pulse trains with repetition rates of 10 THz using femtosecond pulse-shaping techniques.

SUMMARY OF THE INVENTION

The invention features signal processing methods and systems in which optical signals process high bandwidth signals carried by polaritons to overcome the bandwidth limitations of electrical signals. Once processed, the polariton signals can thereafter be converted into electrical output signals or others type of output signals.

In general, in one aspect, the invention features a method of optically processing signals. The method includes: converting a plurality of spatially separated input signals into polaritons that propagate in a signal processing material; optically manipulating the polaritons at a plurality of spatially separated locations in the signal processing material; and converting the manipulated polaritons into at least one output signal. For example, the output signal can be an electrical signal or an electromagnetic signal.

In some embodiments, the optically manipulating step can include manipulating one of the polaritons at a first spatial location to produce a manipulated polariton and interacting the first manipulated polariton with another of the polaritons (or an additional manipulated polariton) at a second spatial location to produce another manipulated polariton. In such embodiments, the optical manipulating step can further include optically manipulating the first manipulated polariton and the other polariton (or additional manipulated polariton) during their interaction at the second spatial location.

In general, in another aspect, the invention features a method of optically processing signals including: converting an input signals into a polariton that propagates in a nonconductive signal processing material; optically manipulating the polariton as it propagates in the signal processing material; and converting the manipulated polaritons into an electrical output signal at an interface between the signal processing material and a conductive path in another material. The material with the conductive path can be a conductor or a semiconductor. For example, it can be a semiconductor substrate and the signal processing material can be a thin film supported by the semiconductor substrate.

Embodiments of either of these signal processing methods can include any of the following features. The polaritons and manipulated polaritons can have frequencies in the range of about 0.1 to 10 THz, and in some embodiments in the range of about 0.2 to 5 THz. The input signals can be electrical signals or electromagnetic signals. The signal processing material can include a ferroelectric material. It can also include a photonic crystal having defects that define waveguides in the material in which the polaritons propagate. The optically manipulating step can includes amplifying portions of the polaritons or altering the frequencies of portions of the polaritons. The optically manipulating step can also include generating a spatially patterned optical waveform and directing the optical waveform to the signal processing material or generating a plurality of spatially separated optical waveforms and directing the optical waveforms to the signal processing material. Furthermore, the optical manipulating step can include directing optical radiation having a bandwidth greater than about 100 GHz and a wavelength in the range of about 250 nm to 2.5 microns, and in some cases, in the range of about 450 nm to 1.6 microns.

In general, in another aspect, the invention features a signal processing system that includes: an input source which during operation provides a plurality of spatially separated input signal; a signal processing material which during operation receives the input signals and converts them into polaritons that propagate within the signal processing material; an optical source which during operation directs optical radiation to the signal processing material that manipulates the polaritons at a plurality of spatially separated locations within the signal processing material; and a receiver which during operation receives at least one output signal derived from the optically manipulated polaritons. In some embodiments, the receiver includes a conductive path that forms an interface with the signal processing material, and during operation the receiver receives the output signal by converting at least one of the manipulated polaritons into an electrical signal that propagates from the interface along the conductive path.

In addition, embodiments of the signal processing system can include any of the follow features. The polaritons and manipulated polaritons can have frequencies in the range of about 0.1 to 10 THz, and in some embodiments in the range of about 0.2 to 5 THz. The input signals can be electrical signals or electromagnetic signals. The signal processing material can include a ferroelectric material. It can also include a photonic crystal having defects that define waveguides in the material in which the polaritons propagate. The optical radiation from the source can manipulate the polaritons by amplifying portions of the polaritons or altering the frequencies of portions of the polaritons. The optical source can generate a spatially patterned optical waveform or a plurality of spatially separated optical waveforms. Furthermore, the optical radiation provided by the source can have a bandwidth greater than about 100 GHz and a wavelength in the range of about 250 nm to 2.5 microns, and in some cases, in the range of about 450 nm to 1.6 microns.

A polariton is a signal having an electromagnetic (EM) component and propagating within a polar or polarizable medium. The medium can be a single crystal, a polycrystalline bulk material, a thin film, a patterned structure, an inhomogeneous structure, or a multilayer assembly. Furthermore, the medium can be in contact or in close proximity, e.g., about 10 microns, to a semiconductor or substrate that need not be polar. The propagating polariton signal can be strongly or weakly coupled to polar material excitations, such as lattice vibrations or phonons. In such cases the polariton can be referred to as a phonon-polariton. The frequency for a phonon-polariton is typically in the range of about 0.1 to 10 THz.

The methods and systems described above permit high bandwidth signals to be processed without the bandwidth limitations of electrical signals, and thereafter converted into electrical signals, if desired. As a result, the methods and systems can combine the high bandwidth capacity of optical signal processing with the reliability of conventional electrical signal processing. For example, a high bandwidth signal, e.g., an optical, terahertz, or electrical signal, can be demultiplexed and then converted into low bandwidth electrical signals.

Other features and advantages will be apparent from the following detailed description and from the claims.

BRIEF DESCRIPTION OF THE DRAWING

FIG. 4 shows binary data sequences for signals referenced in the embodiment shown in FIG. 2.

DETAILED DESCRIPTION

Figure 1:
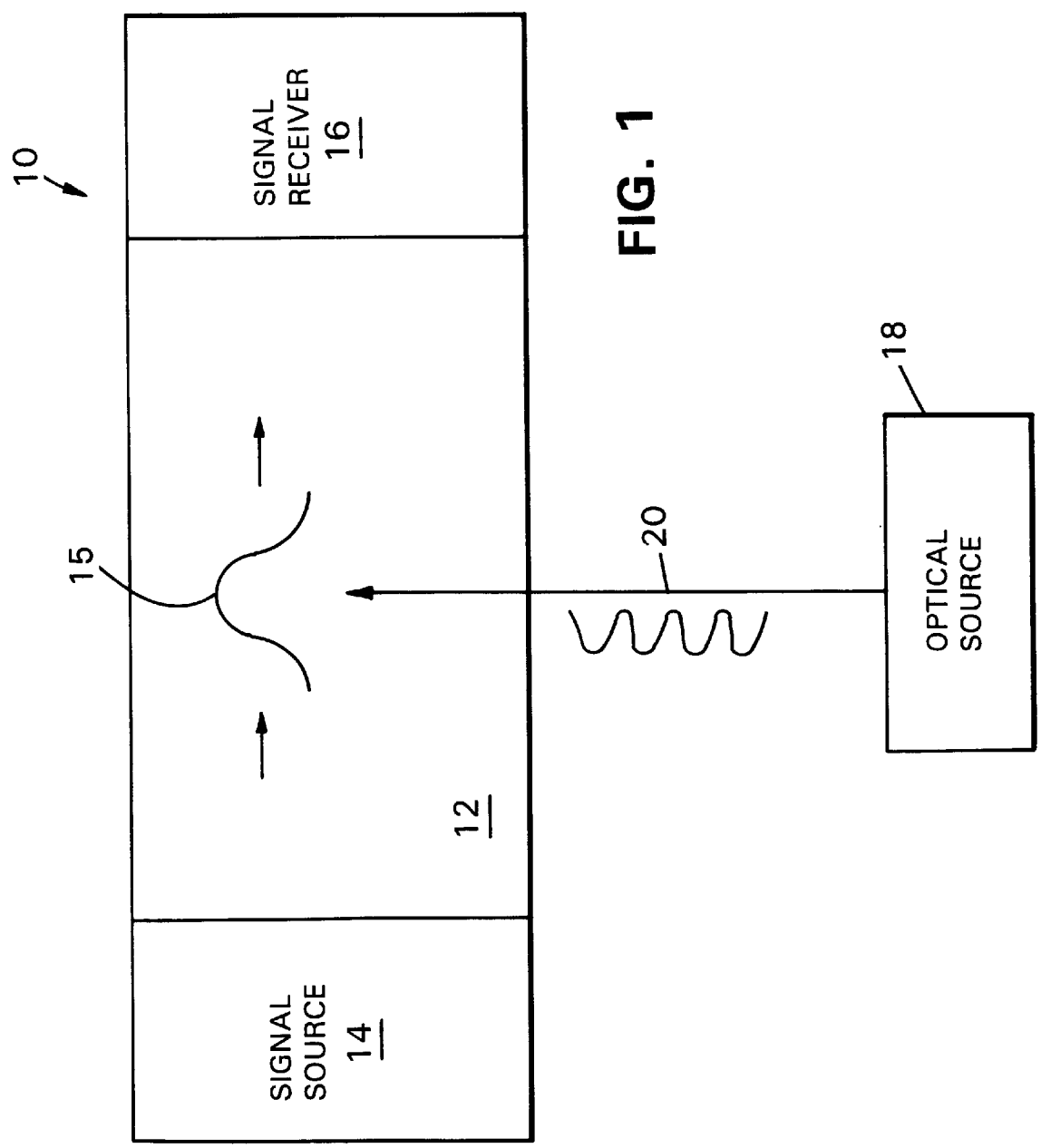
FIG. 1 is a general schematic of signal processing system in which optical signals manipulate polariton signals.

Referring to FIG. 1, an optical-processing material 12 forms a portion of an optoelectronic integrated circuit 10. Signals 15 from a signal source 14 propagate within optical-processing material 12 toward a signal receiver 16. A separate optical source 18 generates spatially and/or temporally shaped optical waveforms 20 and directs them to optical processing material 12. Waveforms 20 interact with signals 15 within material 12 and manipulate the propagating signals so that they are processed upon reaching signal receiver 16.

In general, signal source 14 and signal receiver 16 can be any of a number of optoelectronic elements that generate or propagate an electromagnetic or electrical signal. For example, source 14 and receiver 16 can be any of the following: an output coupler, an optical power splitter, a power generator, a resonator, a filter, an all-optical gate, an electro-optical gate, a magneto-optical gate, a conductor, or a transistor.

Signal processing material 12 is a material in which signals 15 propagate as polaritons, which are waves that couple an electromagnetic (EM) field component with a material component in polar or polarizable medium. For example, phonon-polaritons are waves that couple an EM field with a molecular or lattice displacement. For a general reference, see, e.g., Charles Kittel in *Introduction to Solid State Physics* (John Wiley and Sons, 1996). Polaritons such as signals 15 are responsive to a linear or non-linear optical interaction with optical waveforms 20 from optical source 18.

Signal-processing material 12 is a non-centrosymmetric material that includes, e.g., one or more materials selected from ferroelectric materials such as lithium tantalate ($LiTaO_3$), lithium niobate ($LiNbO_3$), lead titanate ($PbTiO_3$), potassium niobate ($KNbO_3$), barium titanate ($BaTiO_3$), potassium tantalate niobate ($KTa_{1-x}Nb_xO_3$) PZT ($KZr_xTi_{1-x}O_3$), and PLZT ($K_{1-y}I_yZr_xTi_{1-x}O_3$), crystals in the KDP and KTP families, and organic crystals such as DAST. The material can be a bulk material, a thin film on a substrate, or a layered heterostructure. Furthermore, the materials can be fabricated as patterned structures including, e.g., photonic crystals that define bandgaps in which EM radiation having particular frequencies are forbidden, as will be described later. The materials can also be in direct contact or close proximity to other materials in which signals are influences or generated by the polaritons.

Figure 2:
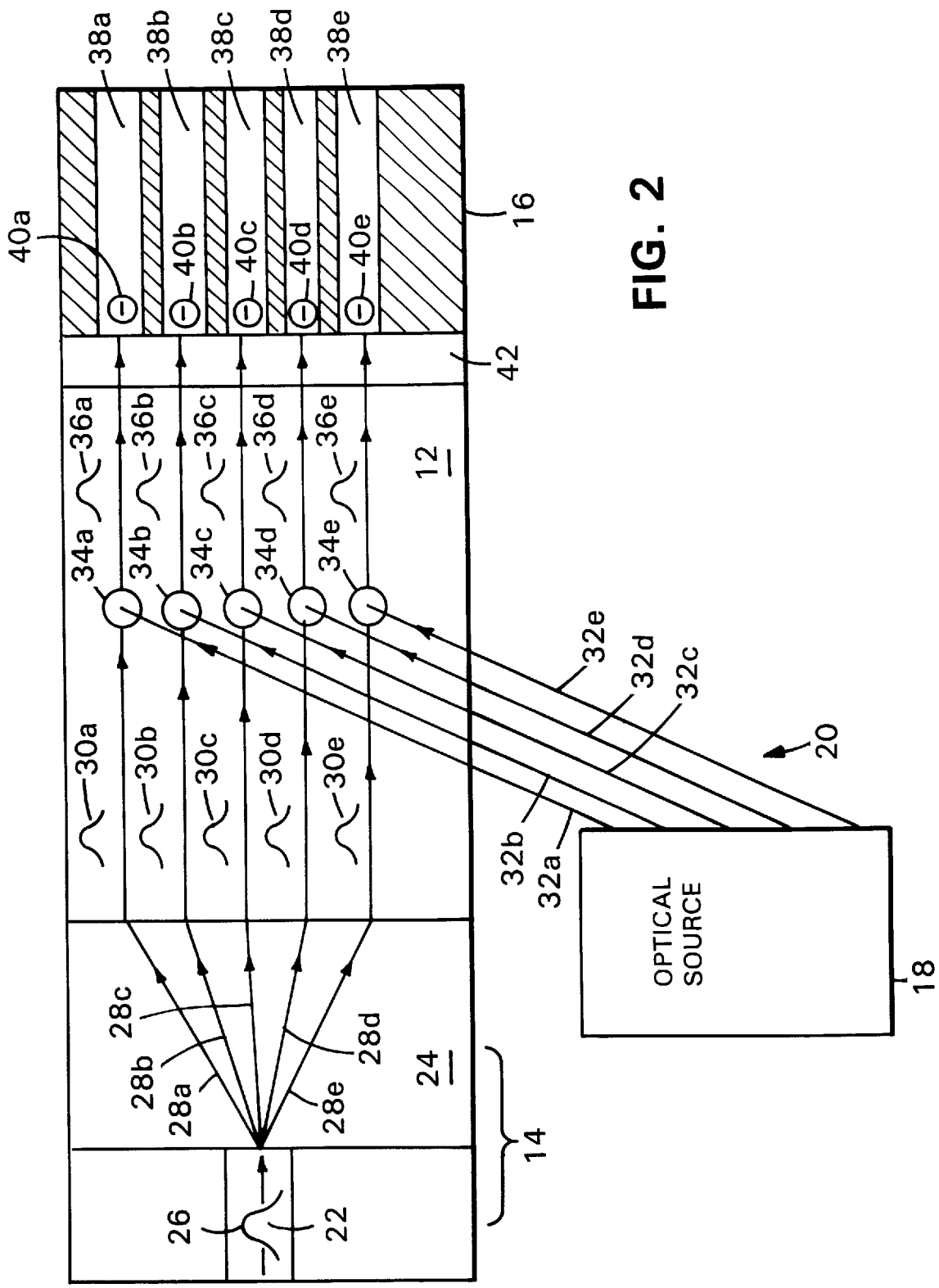
FIG. 2 is a schematic of a signal processing system for demultiplexing high bandwidth signals.

Referring to the embodiment shown in FIG. 2, signal source 14 includes a waveguide 22 that delivers a high bandwidth terahertz EM radiation 26 to signal processing material 12 as an input signal. The terahertz radiation can be generated by any of a number of ways known in the art. For example, terahertz radiation can be produced using ultrafast optical signals from a femtosecond laser to modulate electromagnetic radiation emitted from gallium arsenide (GaAs) quantum well structures. See, e.g., I. Rener et al. (Appl. Phys. Lett., 63:2213, 1993). In other embodiments, the input signal can be different from a terahertz signal, for example the input signal can be an optical signal or a high bandwidth electrical signal.

Signal source 14 further includes an optical or electrical splitter 24 that splits the input signal into multiple, separate signals that propagate into signal processing material 12. In the embodiment of FIG. 2, an optical splitter 24 splits terahertz radiation 26 into 5 separate signals 28-*a-e*, which are converted into phonon-polariton signals 30*a-e* as they propagate into material 12. For example, if the signal processing material 12 is a lithium tantalate crystal, it is oriented such that the time-dependent electric field from signals 28*a-e* couples to polar lattice modes in the crystal. As a result, phononpolariton signals 30*a-e* propagate within the crystal as coupled waves that are part electromagnetic field and part polar lattice vibration.

Figure 3:
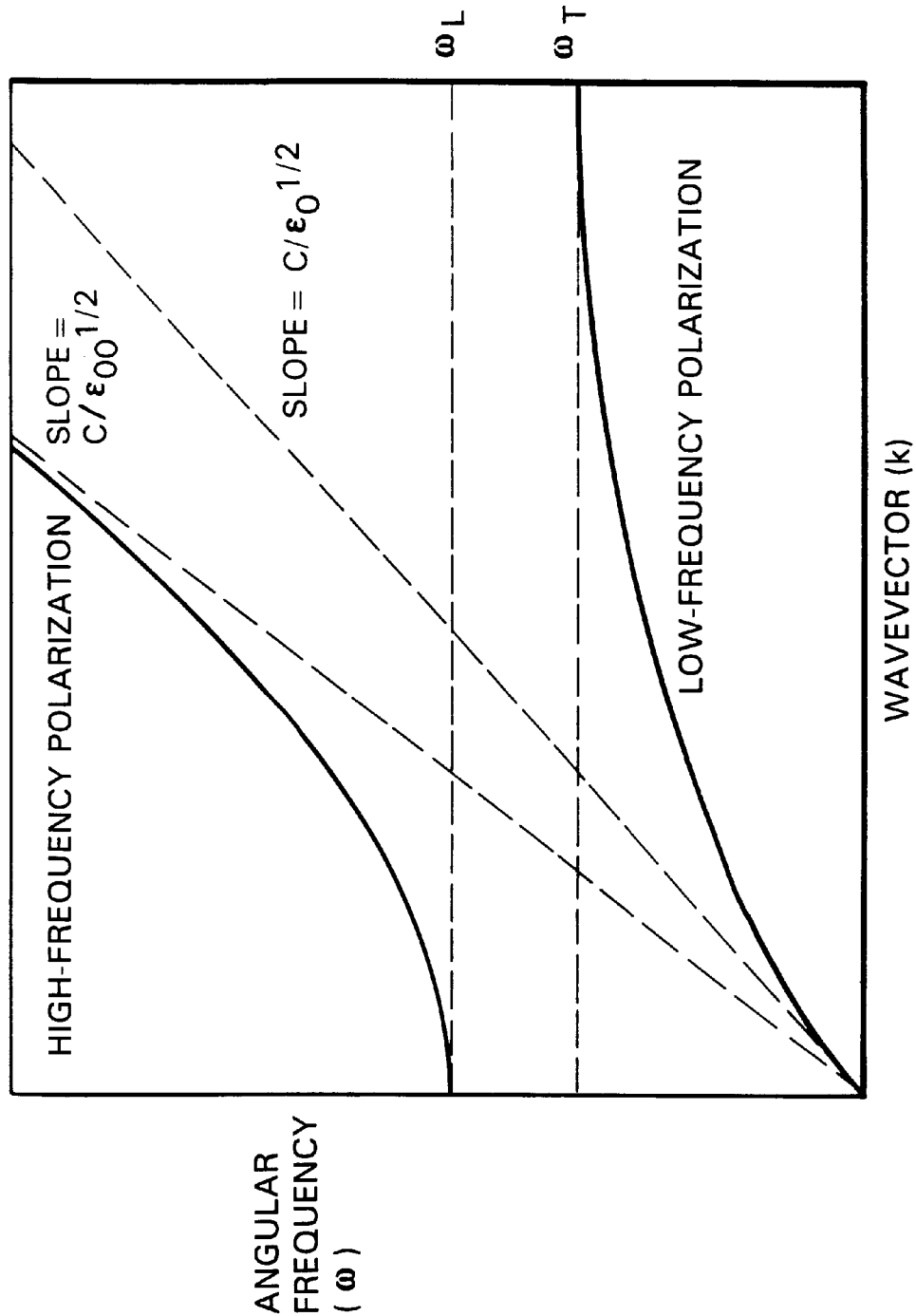
FIG. 3 is a plot of dispersion curves for a phonon-polariton mode in a bulk material.

Phonon-polaritons typically occur in a relatively low wavevector regime where the EM frequency is comparable to the frequency of a polar lattice vibration. Because the polar vibration couples to EM radiation, the lattice vibration is dispersive in this wavevector regime and produces propagating responses. FIG. 3 shows a typical dispersion curve for the frequency of a transverse polar lattice vibration in the polariton region in a bulk material. The frequency of the lower branch approaches the transverse optic phonon frequency $\omega_T$ at large wavevector k, while the frequency of the higher branch approaches the longitudinal optic phonon frequency $\omega_L$ at small wavevector k. For a general reference on excitation of phonon-polaritons see, for example, T. P. Dougherty et al. (*J. Opt. Soc. Am. B.*, 9:2179, 1992).

As phonon-polariton signals 30*a-e* propagate within signal processing material 12, they can be manipulated by high bandwidth optical waveforms 20 that are directed at the material 12 from optical source 18 to spatially overlap the path of the phonon-polariton signals. For example, as shown in FIG. 2, optical waveforms 20 include spatially separated optical signals 32a–e or their induced responses within material 12 that intersect regions 34a–e, respectively, of material 12, regions through which phonon-polariton signals 30a–e propagate. Optical source 18 is synchronized with signal source 14 such that optical signals 32a–e temporally overlap with phonon-polariton signals 30a–e. In particular, in the presently-described embodiment, optical waveforms demultiplex phonon-polariton signals 30a–e into signals that are converted into lower bandwidth electrical signals that propagate along conductive paths 38a–e in receiver 16, as described below.

For the purposes of illustration, the high bandwidth input signal 26 has 1 THz bandwidth, binary-valued data at a repetition rate of 100 GHz and includes as a representative data sequence the 150 psec duration data sequence shown in FIG. 4. Prior to interactions with optical signals 32a–e, phonon-polariton signals 30a–e each carry an identical data sequence as that of input signal 26. As also shown in FIG. 4, each of the optical signals are binary-valued pulse trains having bandwidths of 1 THz and repetition rates of 20 GHz, with each of the signals temporally shifted from its neighbor by 10 psec. Each pulse in each of optical signals 32a–e amplifies a corresponding phonon-polariton data bit that is temporally and spatially overlapped with that pulse at one of the regions 34a–e.

As shown in FIG. 2, the amplification at regions 4a–e produce manipulated phonon-polariton signals 36a–e hat propagate toward electrically conductive paths 38a–e in receiver 16. At the interface of material 12 and receiver 16, each of the phonon-polariton signals 36a–e behaves as an oscillating dipole that produces corresponding electrical signals 40a–e in conductive paths 38a–e, respectively. However, because of bandwidth limitations induced by thermal scattering of charge carriers, each of the electrical signals will be a convolution of a corresponding manipulated phonon-polariton signal with a bandwidth-limited pulse having a duration of about, e.g., 30 psec. If necessary, receiver 16 can be cryogenically cooled to provide the 30 GHz bandwidth in each of conductive paths 38a–e. In addition, circuit 10 can include a filter 42 between material 12 and receiver 16 that only passes portions of signals 36a–e that exceed a minimum threshold intensity, thereby removing noise. Alternatively, filter 42 can be frequency filter that removes noise.

The resulting electrical signals 40a–e have repetition rates of 20 GHz and correspond to the data sequences shown in FIG. 4. In particular, signals 40a–e are demultiplexed signals corresponding to temporally shifted 20 GHz channels in the original 100 GHz high bandwidth signal 26. Thus, the optical manipulation of the propagating polariton signals demultiplexed a high bandwidth EM signal into low bandwidth electrical signals.

Optical source 18 can be a system including a femtosecond laser and a temporal and/or spatial pulse shaping apparatus, such as those described in U.S. Pat. Nos. 5,682, 262 and 5,719,650, the contents of which are incorporated herein by reference in their entirety. Such systems involve dispersive optics that separate high bandwidth optical pulses into spectral components that can be filtered by one dimension of a mask, such as a liquid crystal display. A second dimension of the mask can couple spatial shaping to the spectral shaping imparted by the first dimension. The pulse shaping apparatus recombines the spectrally and spatially filtered components of the optical pulse to produce the temporally and/or spatially shaped optical waveforms 20.

In the example shown in FIGS. 2 and 4, optical waveforms 20 amplify phonon-polariton signals 30a–e that are spatially and temporally coincident with pulses 32a–e. Any of a number of optical mechanisms known in the art could be used to produce such amplification. For example, optical pulses 32a–e can amplify the phonon-polaritons by impulsive stimulated Raman scattering (ISRS), whereby the optical pulses drive phonon-polariton modes that interfere constructively with signals 30a–e that are spatially and temporally coincident. Destructive interference with unwanted signal components can also be carried out.

In ISRS, one or more ultrashort (e.g., typically less than 200 fs) excitation pulses exerts a sudden ("impulse") force on those Raman-active modes whose vibrational periods are longer than the pulse duration. This sudden driving force produces time-dependent vibrational oscillations. For a general reference on ISRS see, for example, Y. Yan and K. A. Nelson (*J. Chem Phys.*, 87:6240, 1987). In non-centrosymmetric materials such as material 12, the excited Raman-active vibrational modes can also be polar and they can generate and couple to electromagnetic radiation, thereby amplifying the phonon-polaritons. The ISRS excitation can be performed using excitation by a single beam or in a grating or single beam or other spatially varying pattern or profile.

An alternative mechanism for amplifying phonon-polariton signals 30a–e is the electro-optic effect, which an occur in response to ultrashort visible pulses similar to those used in the ISRS mechanism. In accordance with an electro-optic mechanism, material 12 rectifies an ultrashort visible excitation pulse to produce a short burst of terahertz radiation that interferes constructively with signals 30a–e that are spatially and temporally coincident, thereby amplifying these coincident signals. For a reference on the electro-optic mechanism, see, for example, D. H. Auston and M. C. Nuss (*IEEE J. Quan. Elec.*, 24:184, 1988). In general, the amplifying radiation may be optimized through its temporal, spectral, spatial, and polarization profiles to produce the desired output signals.

In other embodiments, optical waveforms 20 can be used to manipulate phonon-polariton signals in ways different from amplification. For example, the optical waveforms can shift the frequency of phonon-polariton signals by non-linear optical mixing, or the optical waveforms can interact with the phonon-polariton signals by non-linear mixing to form new phonon-polariton signals. The new phonon-polariton signals can have the same or different frequency and/or direction as those of the initial phonon-polariton signal. In addition, the optical waveforms can manipulate the phonon-polariton signals by narrowing or broadening the width of individual phonon-polariton wavepackets. To accomplish these types of manipulation, any of a number of non-linear optical interactions can be used, such as difference frequency mixing, hyper-Raman scattering, and harmonic generation. For a general reference on nonlinear mechanisms, see for example, Y. R. Shen in *The Principles of Non-Linear Optics* (New York: J. W. Wiley Interscience, 1984). For example, two discrete light frequency components could be selected in the optical waveforms such that stimulated Raman scattering or difference-frequency mixing produces a polariton response that interferes with the propagating signal to generate a specified output.

For example, referring again to FIG. 2, rather than having optical pulses 32a–e amplify those phonon-polariton signals 30a–e that are temporally and spatially coincident, the optical pulses can be used to alter the frequencies of the phonon-polariton signals by a non-linear interaction. In particular, a difference frequency $\Delta\omega$ between spectral components of optical pulses 32a–e will add to the frequency $\omega_0$ of the phonon-polariton signals 30a–e that are temporally and spatially coincident with the pulses to produce a frequency $\omega_1$ in the manipulated phonon-polariton signals 36a–e equal to $\omega_0+\Delta\omega$. In such a case, filter 42 is a frequency filter used to block the portion of the manipulated polariton signals that have frequency $\omega_0$ and pass the portion of signals that have frequency $\omega_1$. Thus, the data sequences for the resulting electrical signals 40a–e would be identical to those shown in FIG. 4 and the original data sequence in signal 26 is again demultiplexed into five separate time-shifted channels. In other embodiments and depending on the particular non-linear optical interaction, rather than upconverting the phonon-polariton frequency to $\omega_0+\Delta\omega$, the optical waveforms 20 can be used to downconvert the frequency to $\omega_0-\Delta\omega$. In general, many signal processing operations including convolution and deconvolution, frequency analysis, channel selection, logic operations, and others can be carried out.

To produce such non-linear interactions, the peak intensity of optical waveforms 20 typically needs to be greater than $1\times10^6$ W/cm$^2$, or more typically greater than $1\times10^8$ W/cm$^2$. Depending on the non-linear mechanism, optical waveforms includes continuous-wave radiation instead of, or in addition to, pulsed radiation. Also, the optical waveforms can include multiple beams having the same or different frequencies, frequency profiles, temporal profiles, or spatial profiles.

In some embodiments, signal processing material 12 can be a photonic crystal, which can include defects that form waveguides to channel phonon-polariton signals to and from signal processing sites. Alternatively, the signal processing sites themselves can be defects in the photonic crystal that form resonant cavities within material 12.

Photonic crystals are structures having a periodic variation in dielectric constant that give rise to a photonic bandgap. EM radiation having a frequency within the photonic bandgap cannot propagate within the photonic crystal. For a general reference on photonic crystals, see: J. D. Joannopoulos et al., *Photonic Crystals*, (Princeton University Press, Princeton, 1995). Photonic crystals can be fabricated using various methods known in the art including, for example, the methods described in U.S. Pat. No. 5,600,483, the contents of which are incorporated herein by reference.

Photonic crystals can include defects with respect to their periodicity that support a localized electromagnetic mode having a frequency within a photonic bandgap. For example, in a three-dimensional photonic crystal formed from dielectric spheres at the sites of a diamond lattice, the absence of a sphere produces a defect. In the immediate vicinity of the absent sphere, the photonic crystal is no longer periodic, and a localized electromagnetic mode having a frequency within the photonic bandgap can exist. This defect mode cannot propagate away from the absent void but is localized in the vicinity of the defect. Thus, the introduction of a defect into the photonic crystal creates a resonant cavity, i.e., a region of the crystal that confines EM radiation having a specific frequency within the region. Resonant cavities are used in optical devices such as lasers and light-emitting diode displays, as well as components for microwave and millimeter wave applications, such as filters and power generators. Brommer et al. describes fabricating such devices by introducing defects into photonic crystals in U.S. Pat. Nos. 5,187,461, 5,389,943 and 5,471,180, the contents of which are incorporated herein by references.

In other applications, a photonic crystal includes a series of defects that define a waveguide within the photonic crystal. The series of defects support EM modes having frequencies within the photonic bandgap that can propagate along the series of defects but are otherwise confined to regions of the photonic crystal in the vicinity of these defects. Defect-based waveguides in photonic crystals can include sharp turns since the photonic bandgap can prevent propagation of the EM radiation away from the waveguide for at least some, if not all, propagation directions. Methods of making such waveguides and incorporating them into optoelectronic integrated circuits are described by Meade et al. in U.S. Pat. No. 5,526,449, the contents of which are incorporated herein by reference.

Figure 5:
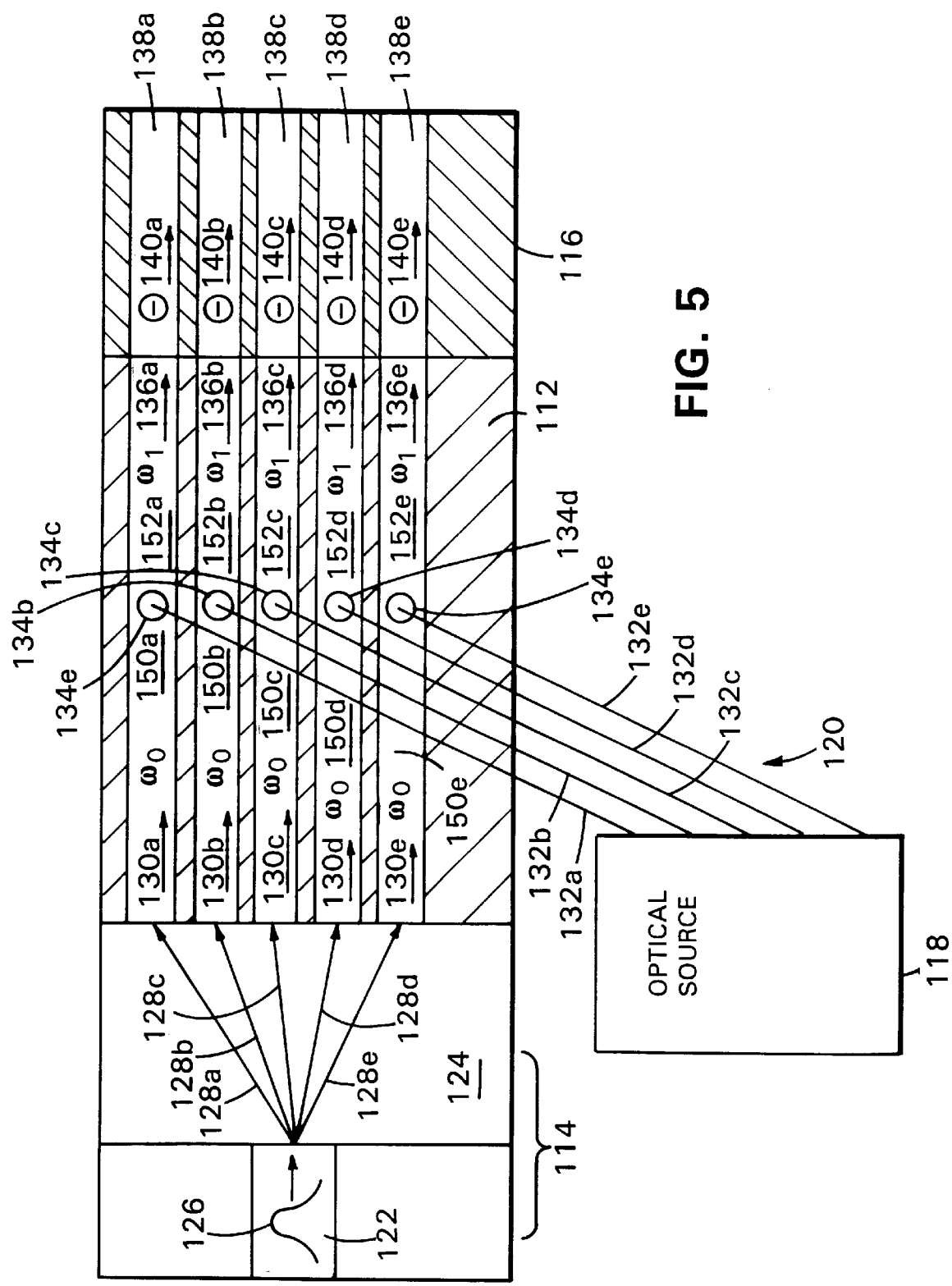
FIG. 5 is a schematic of a signal processing system in a photonic crystal.

Using such waveguides, an application similar to that shown in FIG. 2 is shown in FIG. 5. Signal processing material 112 is a photonic crystal having defects that define waveguides 150a–e adjacent an optical splitter 124 in a signal source 114. As in FIG. 2, the optical splitter splits input signal 126 into 5 separate signals 128a–e, which are converted into phonon-polariton signals 130a–e as they propagate into material 112. Unlike FIG. 2, signals 130a–e propagate into waveguides 150a–e, respectively. The photonic crystal is designed such that waveguides 150a–e support the propagation of phonon-polaritons having the frequency $\omega_1$ and terminate at regions 134a–e, respectively. Defects in the photonic crystal also define waveguides 152a–e, which support the propagation of phonon-polaritons having the frequency $\omega_1=\omega_0+\Delta\omega$, forbid the propagation of phonon-polaritons having the frequency $\omega_0$, and connect regions 134a–e to conductive paths 138a–e, respectively, in signal receiver 116. Thus, regions 134a–e function as gates that block the propagation of signals 130a–e, unless optical waveforms 120 provided by optical source 118 upconvert one or more portions of signals 130a–e to frequency $\omega_1$ through a non-linear interaction at regions 134a–e, respectively, as described above.

As in FIG. 2, optical source 118 generates and directs optical waveforms 120 to regions 134a–e as a series of five pulse trains 132a–e, respectively. Those portions of signals 130a–e that are frequency upconverted by optical pulses 132a–e form manipulated phonon-polariton signals 136a–e, respectively, which propagate toward conductive paths 138a–e where they are converted into electrical signals 140a–e, respectively. Assuming that each of the signals 130a–e carry the data sequence shown in FIG. 4 for input signal 26, and that optical pulses 132a–e carry the control signals shown in FIG. 4 for optical signals 32a–e, respectively, the data sequences for electrical signals 140a–e correspond to those shown in FIG. 4 for electrical signals 40a–e, respectively.

Thus, the application in FIG. 5 is similar to that shown FIG. 2 with the optical waveforms 120 demultiplexing the original high bandwidth signal into five lower bandwidth signals. In other applications, the demultiplexing can be different from the time demultiplexing scheme illustrated in FIG. 4. For example, the optical waveforms 120 can include conjugate signals for demultiplexing code-division multiple access (CDMA) data sequences in the high bandwidth signal 126.

It is important to note that while defects in the photonic crystal confine signals 130a–e in waveguides 150a–e, respectively, and signals 136a–e in waveguides 152a–e, respectively, optical waveforms 120 can propagate through the photonic crystal and manipulate signals 130a–e because their higher frequencies will be outside the photonic bandgap. Thus, the optical waveforms can propagate into the photonic crystal and manipulate, e.g., through a non-linear optical interaction, phonon-polaritons that are confined in cavities and/or waveguides defined by defects in the photonic crystal. Moreover, the optical waveforms can propagate into the photonic crystal and generate, e.g., through a non-linear optical interaction, new phonon-polaritons that are confined in cavities and/or waveguides defined by defects in the photonic crystal. See, e.g., copending patent application U.S. Ser. No. 09/053,160, filed Apr. 1, 1998, and entitled "Methods and Systems for Introducing Electromagnetic Radiation into Photonic Crystals," the contents of which are incorporated herein by reference in its entirety.

Processing that is different from multiplexing and demultiplexing is also possible. For example, in the applications shown in FIGS. 2 and 5, the phonon-polariton signals are processed independently from one another, whereas in other applications, the phonon-polariton signals can interact with one another. Furthermore, cascaded processing is possible whereby an optical waveform manipulates a phonon-polariton signal and thereafter the manipulated phonon-polariton signal interacts with another phonon-polariton signal, possibly in a non-linear interaction that includes a second optical waveform. Waveguides provided by defects in a photonic bandgap material are especially suitable for such applications, as described below.

Figure 6:
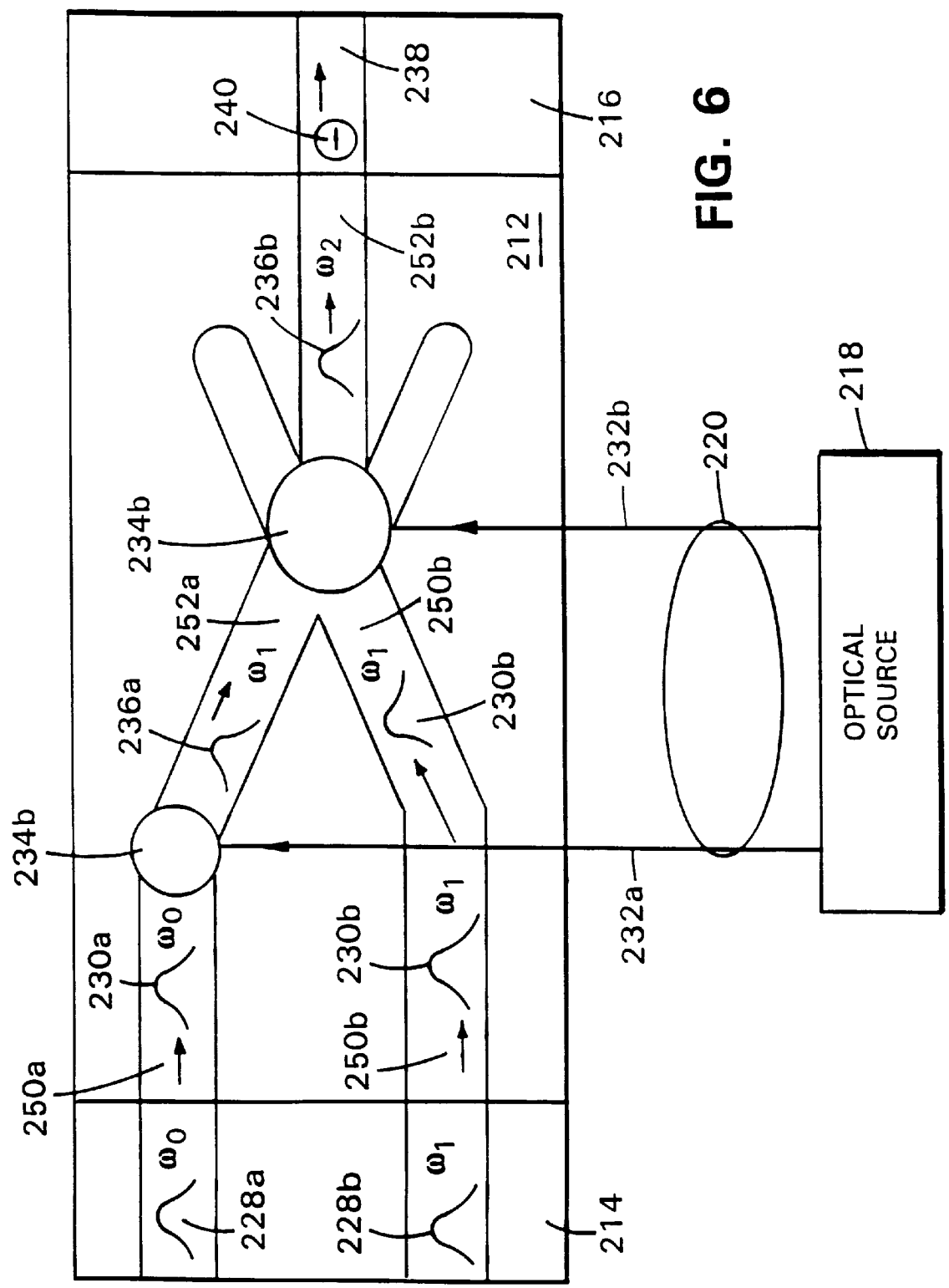
FIG. 6 is a schematic of a signal processing system involving cascaded interactions.

Referring to FIG. 6, a signal source 214 provides two terahertz signals 228a–b having frequencies $\omega_0$ and $\omega_1$, respectively, and introduces the signals into waveguides 250a–b, respectively, of a photonic crystal 212. Once in the photonic crystal, signals 228a–b propagate as phonon-polariton signals 230a–b. Waveguide 250a supports polariton propagation of signals having frequency $\omega_0$ and terminates at region 234a where waveguide 252a begins and supports polariton propagation of signals having frequency $\omega_1$. Temporally and spatially shaped optical waveforms 220 from an optical source 218 include optical pulse 232a directed to region 234a. If optical pulse 232a or its induced response in material 212 is temporally coincident with signal 230a, it can upconvert signal 230a to produce a manipulated phonon-polariton signal 236a having a frequency $\omega_1$.

Waveguides 250b and 252a support polariton propagation of signals having frequency $\omega_1$ and intersect at region 234b where waveguide 252b begins and connects to conductive path 238 in receiver 216. Waveguide 252b supports polariton propagation of signals having frequency $2\omega_1$. If signal 230b and manipulated signal 236a are temporally coincident with one another, they can interact with one another at region 234b and undergo second harmonic generation in the photonic crystal to form manipulated signal 238b having frequency $2\omega_1$. Manipulated signal 236b propagates along a wavevector that is the sum of the wavevectors of signals 230b and 236a and follows waveguide 252b. Upon reaching receiver 216, manipulated signal 236b is converted into an electrical signal propagating along conductive path 238.

Temporally and spatially shaped optical waveforms 220 can also include optical pulse 232b directed to region 234b. If optical pulse 232b is temporally coincident with signals 230b and 236a at region 234b, it can resonantly enhance the second harmonic generation of manipulated signal 236b, thereby increasing the intensity of signal 236b. In some embodiments, the resonant enhancement imparted by optical pulse 232b is necessary to produce a threshold intensity for signal 236b necessary for detection in receiver 216. In general, sum and difference frequency generation and other nonlinear responses can provide the basis for manipulation of this type.

The embodiment in FIG. 6 illustrates a simple example of a logical circuit in which the output signal 236b depends on the input signals 228a–b and the processing optical pulses 234a–b. In general, more complicated logical circuits can be constructed by further interacting and/or cascading the input signals and manipulated polariton signals with one another and mediating such interactions by directing spatially and temporally shaped optical waveforms to the polaritons as they propagate in the signal processing material.

Other embodiments are also possible. For example, rather than directing EM terahertz radiation into the signal processing material, the signal source can be a conductor that directs high bandwidth electrical signals, e.g., from a superconducting Josephson junction, to the signal processing material. At the interface of the signal processing material, the high bandwidth electrical signals generate corresponding phonon-polaritons signals. Alternatively, the signal source can direct high bandwidth optical signals to the signal processing material that are rectified by signal processing material, e.g., a ferroelectric, to produce the high bandwidth phonon-polariton signals.

Other aspects, advantages, and modifications are within the scope of the following claims.

What is claimed is:

1. A method of optically processing signals comprising:
   converting a plurality of spatially separated input signals into polaritons that propagate in a signal processing material;
   optically manipulating the polaritons at a plurality of spatially separated locations in the material; and
   converting the manipulated polaritons into at least one output signal,
   wherein the polaritons and manipulated polaritons have frequencies in the range of about 0.1 to 10 THz.

2. The method of claim 1, wherein optically manipulating comprises optically manipulating one of the polaritons at a first spatial location to produce a manipulated polariton and interacting the first manipulated polariton with another of the polaritons at a second spatial location to produce another manipulated polariton.

3. The method of claim 2, wherein optically manipulating further comprises optically manipulating the first manipulated polariton and the other polariton during their interaction at the second spatial location.

4. The method of claim 1, wherein the input signals are one of electrical signals and electromagnetic signals.

5. The method of claim 1, wherein the output signal is one of an electrical signal and an electromagnetic signal.

6. The method of claim 1, wherein the material comprises a ferroelectric material.

7. The material of claim 1, wherein the material comprises a photonic crystal having defects that define waveguides in the material and wherein the polaritons propagate within the waveguides.

8. The method of claim 1, wherein optically manipulating comprises amplifying portions of the polaritons.

9. The method of claim 1, wherein optically manipulating comprises altering the frequencies of portions of the polaritons.

10. The method of claim 1, wherein optically manipulating comprises generating a spatially patterned optical waveform and directing the optical waveform to the material.

11. The method of claim 1, wherein optically manipulating comprises generating a plurality of spatially separated optical waveforms and directing the optical waveforms to the material.

12. The method of claim 1, wherein optical manipulating comprises directing optical radiation having a bandwidth greater than about 100 GHz to the material.

13. The method of claim 12, wherein the optical radiation has a wavelength in the range of about 250 nm to 2.5 microns.

14. A method of optically processing signals comprising:

converting an input signals into a polariton that propagates in a non-conductive signal processing material;

optically manipulating the polariton as it propagates in the signal processing material; and converting the manipulated polaritons into an electrical output signal at an interface between the signal processing material and a conductive path in another material.

15. The method of claim 14, wherein the other material is a semiconductor substrate.

16. The method of claim 15, wherein the signal processing material is a thin film supported by the semiconductor substrate.

17. The method of claim 14, wherein the polariton has a frequency in the range of about 0.1 to 10 THz.

18. A signal processing system comprising:

an input source which during operation provides a plurality of spatially separated input signal;

a signal processing material which during operation receives the input signals and converts them into polaritons that propagate within the signal processing material;

an optical source which during operation directs optical radiation to the signal processing material that manipulates the polaritons at a plurality of spatially separated locations within the signal processing material; and a receiver which during operation receives at least one output signal derived from the optically manipulated polaritons.

19. The signal processing system of claim 18, wherein the receiver comprises a conductive path that forms an interface with the signal processing material, and wherein during operation the receiver receives the output signal by converting at least one of the manipulated polaritons into an electrical signal that propagates from the interface along the conductive path.

20. A method of optically processing signals comprising:

converting a plurality of spatially separated input signals into polaritons that propagate in a signal processing material comprising a ferroelectric material;

optically manipulating the polaritons at a plurality of spatially separated locations in the material; and converting the manipulated polaritons into at least one output signal.

21. The method of claim 20, wherein optically manipulating comprises optically manipulating one of the polaritons at a first spatial location to produce a manipulated polariton and interacting the first manipulated polariton with another of the polaritons at a second spatial location to produce another manipulated polariton.

22. The method of claim 21, wherein optically manipulating further comprises optically manipulating the first manipulated polariton and the other polariton during their interaction at the second spatial location.

23. A method of optically processing signals comprising:

converting a plurality of spatially separated input signals into polaritons that propagate in a signal processing material comprising a photonic crystal having defects that define waveguides in the material, wherein the polaritons propagate within the waveguides;

optically manipulating the polaritons at a plurality of spatially separated locations in the material; and converting the manipulated polaritons into at least one output signal.

24. The method of claim 23, wherein optically manipulating comprises optically manipulating one of the polaritons at a first spatial location to produce a manipulated polariton and interacting the first manipulated polariton with another of the polaritons at a second spatial location to produce another manipulated polariton.

25. The method of claim 24, wherein optically manipulating further comprises optically manipulating the first manipulated polariton and the other polariton during their interaction at the second spatial location.

26. A method of optically processing signals comprising:

converting a plurality of spatially separated input signals into polaritons that propagate in a signal processing material;

optically manipulating the polaritons at a plurality of spatially separated locations in the material, wherein optically manipulating comprises amplifying portions of the polaritons; and converting the manipulated polaritons into at least one output signal.

27. The method of claim 26, wherein optically manipulating further comprises optically manipulating one of the polaritons at a first spatial location to produce a manipulated polariton and interacting the first manipulated polariton with another of the polaritons at a second spatial location to produce another manipulated polariton.

28. The method of claim 27, wherein optically manipulating further comprises optically manipulating the first manipulated polariton and the other polariton during their interaction at the second spatial location.

29. A method of optically processing signals comprising:

converting a plurality of spatially separated input signals into polaritons that propagate in a signal processing material;

optically manipulating the polaritons at a plurality of spatially separated locations in the material, wherein optically manipulating comprises altering the frequencies of portions of the polaritons; and converting the manipulated polaritons into at least one output signal.

30. The method of claim 29, wherein optically manipulating further comprises optically manipulating one of the polaritons at a first spatial location to produce a manipulated polariton and interacting the first manipulated polariton with another of the polaritons at a second spatial location to produce another manipulated polariton.

31. The method of claim 30, wherein optically manipulating further comprises optically manipulating the first manipulated polariton and the other polariton during their interaction at the second spatial location.

32. A method of optically processing signals comprising:

converting a plurality of spatially separated input signals into polaritons that propagate in a signal processing material;

optically manipulating the polaritons at a plurality of spatially separated locations in the material, wherein optically manipulating comprises generating a spatially patterned optical waveform and directing the optical waveform to the material; and converting the manipulated polaritons into at least one output signal.

33. The method of claim 32, wherein optically manipulating further comprises optically manipulating one of the polaritons at a first spatial location to produce a manipulated polariton and interacting the first manipulated polariton with another of the polaritons at a second spatial location to produce another manipulated polariton.

34. The method of claim 33, wherein optically manipulating further comprises optically manipulating the first manipulated polariton and the other polariton during their interaction at the second spatial location.

35. A method of optically processing signals comprising:
converting a plurality of spatially separated input signals into polaritons that propagate in a signal processing material;
optically manipulating the polaritons at a plurality of spatially separated locations in the material, wherein optically manipulating comprises generating a plurality of spatially separated optical waveforms and directing the optical waveforms to the material; and
converting the manipulated polaritons into at least one output signal.

36. The method of claim 35, wherein optically manipulating further comprises optically manipulating one of the polaritons at a first spatial location to produce a manipulated polariton and interacting the first manipulated polariton with another of the polaritons at a second spatial location to produce another manipulated polariton.

37. The method of claim 36, wherein optically manipulating further comprises optically manipulating the first manipulated polariton and the other polariton during their interaction at the second spatial location.

38. A method of optically processing signals comprising:
converting a plurality of spatially separated input signals into polaritons that propagate in a signal processing material;
optically manipulating the polaritons at a plurality of spatially separated locations in the material, wherein optical manipulating comprises directing optical radiation having a bandwidth greater than about 100 GHz to the material; and
converting the manipulated polaritons into at least one output signal.

39. The method of claim 38, wherein optically manipulating further comprises optically manipulating one of the polaritons at a first spatial location to produce a manipulated polariton and interacting the first manipulated polariton with another of the polaritons at a second spatial location to produce another manipulated polariton.

40. The method of claim 39, wherein optically manipulating further comprises optically manipulating the first manipulated polariton and the other polariton during their interaction at the second spatial location.

41. The method of claim 38, wherein the optical radiation has a wavelength in the range of about 250 nm to 2.5 microns.

* * * * *